Sept. 7, 1954 R. HOFGAARD 2,688,739

PROCESS AND APPARATUS FOR THE CODE RECORDING AND THE SENSING OF DATA ON RECORD CARDS

Filed Jan. 27, 1953 2 Sheets-Sheet 1

INVENTOR:

Rolf Hofgaard,

BY Pierce, Scheffler & Parker,

ATTORNEYS.

BLADES OF CONTACT SETS
A & C ENGAGE FRONT CONTACTS
BEFORE LEAVING BACK CONTACTS

INVENTOR:
Rolf Hofgaard,
BY Pierce, Schaffler & Parker,
ATTORNEYS

Patented Sept. 7, 1954

2,688,739

UNITED STATES PATENT OFFICE 2,688,739

PROCESS AND APPARATUS FOR THE CODE RECORDING AND THE SENSING OF DATA ON RECORD CARDS

Rolf Hofgaard, Nordstrandshogda, near Oslo, Norway

Application January 27, 1953, Serial No. 333,590

Claims priority, application Norway April 29, 1946

4 Claims. (Cl. 340—173)

This invention relates to processes of and apparatus for the code recording and the sensing of data on record cards, and more particularly to processes and apparatus which are characterized by the possibility of employing the same apparatus for either the recording or the sensing of code markings on record cards.

In bookkeeping machines, calculating machines and the like it is customary to employ record cards provided with perforations or with selectively conducting and non-conducting areas or spots which represent numerical values and/or letter characters according to a selected coding system. The record cards are selectively punched, or selectively marked with areas of different electrical or optical character and are sensed mechanically, pneumatically, electrically or photoelectrically to control some auxiliary equipment to make arithmetical computations and/or to actuate printing devices to register the significant data sensed from the record cards.

Objects of the present invention are to provide a process and apparatus for the code recording and sensing of data on record cards of the type having a metallic conducting surface, which process and apparatus are characterized by the fact that the same apparatus may be employed alternatively for either operation. Objects are to provide apparatus for the code recording on or the code sensing of record cards of metallic conducting surface type, the apparatus including a conducting pin at each code spot position, and an electrical network including switch devices for applying voltages of different magnitudes to the contact pins; the lower voltage being employed to sense the record cards, and the higher voltage being sufficient to vaporize or evaporate the metallic surface engaged by selectively energized contact pins. An object is to provide apparatus including banks of contact pins relatively arranged according to a coding pattern for the sensing of a card upon which data is recorded by the selective conducting or non-conducting character of the code spots engaged by the contact pins, and an electrical network including relays connected to the respective contact pins and selectively energized according to the conducting or non-conducting character of the code spots; the relays having switch contacts for energizing auxiliary equipment of computing and/or printing type, and/or for a subsequent duplication of the recorded code markings upon another record card.

These and other objects and the advantages of the invention will be apparent from the following specification when taken with the accompanying drawings, in which.

Figure 1:
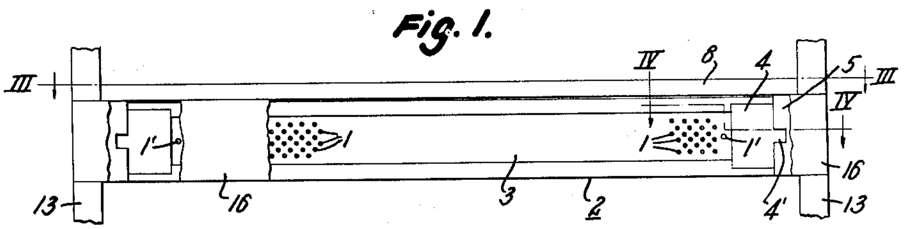
Fig. 1 is a fragmentary front view of a code sensing or code recording apparatus embodying the invention.
Figure 3:
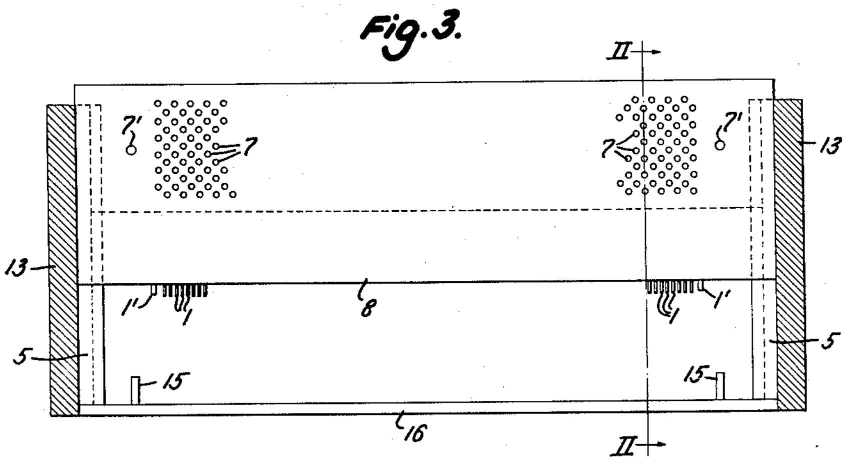
Fig. 3 is a horizontal section on line III—III of Fig. 1.
Figure 2:
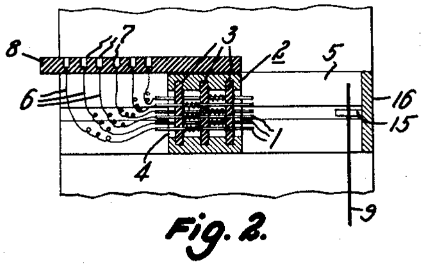
Fig. 2 is a fragmentary vertical section on line II—II of Fig. 3.

In the drawings, the reference numerals 1 identify contact pins which are yieldingly supported in a frame 2 comprising rails 3 of insulating material secured to end pieces 4 having ribs 4' by which the frame is slidably supported on grooved rails 5 of a supporting frame. The contact pins 1 are arranged with their axes parallel and in horizontal planes, and in vertical rows of three each with the pins of adjacent rows staggered to obtain a compact assembly of a large number of contact pins.

Any desired coding system may of course be employed but, as illustrated, it is to be understood that each two adjacent vertical rows of three pins signifies the selected one of 64 different letters, digits or other characters. It is to be noted that selected combinations of six code marks having individual values in the sequence "1," "2," "4," "8," "16" and "32" respectively may represent any value from "1" to "64."

Additional contact pins 1' are mounted in the frame 2 for establishing electrical connections to the conductive sheet or coating of the record cards, and flexible leads 6 connect the contact pins 1 and 1' to terminal sockets 7 and 7', respectively, mounted in an insulating material plate 8 secured to the supporting frame. A pin type of cable connector, not shown, may be inserted into the terminal socket assembly to connect the bank of contact pins 1, 1' into an appropriate electrical network. The frame 2 is slidable on the rails 5 for displacement to bring the contact pins into engagement with a record card or strip, and the flexible leads are provided to permit this movement of the bank of contact pins with respect to the stationary terminal sockets.

Figure 6:
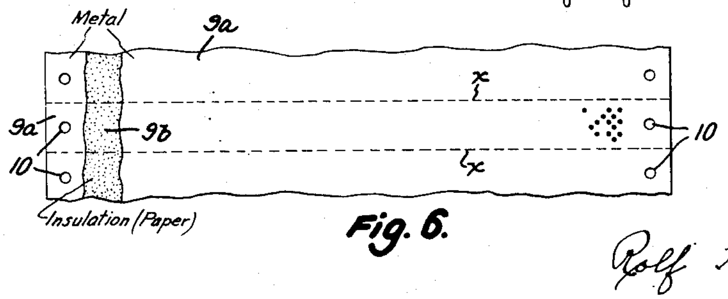
Fig. 6 is a fragmentary plan view of a strip of record material which is provided with a few code markings.

The size of the record card or strip may vary from that of a narrow strip when the data to be recorded can be printed in a single line on a printing device, not shown, forming one unit of the business machine in which the sensing apparatus is incorporated, to that of a card or rectangular sheet when the data to be recorded would run to several printed lines. When the data to be recorded is not subject to periodic or frequent change, such as is the case in bookkeeping machines, it may be convenient to record a great number of items on a long ribbon or strip. As shown in Fig. 6, which illustrates a portion of a record card or strip 9 of sufficient size to record a plurality of items of related or of independent nature, a thin foil or layer 9*a* of metal, for example aluminum, is adherent to one, or as illustrated, to both sides of an insulating material sheet or strip 9*b* of paper, plastic or the like. Each item, corresponding to a line which may be printed on a unit of the complete apparatus, is recorded in the area defined by adjacent parallel lines in Fig. 6. The record sheet or strip 9 is provided with perforations 10 at its opposite sides, and within adjacent lines, for accurately positioning the record sheet or strip 9 with respect to the bank of electrical contact pins. A simple metal foil of sufficient thickness to be self-supporting may be employed in some instances, and different recordings may be made at opposite surfaces of an insulating material sheet having conductive coatings at its opposite faces.

Figure 4:
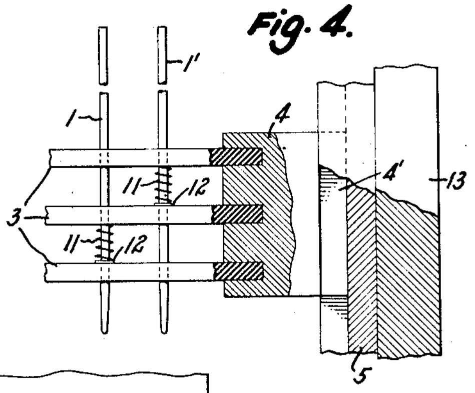
Fig. 4 is a fragmentary bottom view on line IV—IV of Fig. 1, and on an enlarged scale.

To ensure firm contact engagement of all of the pins 1 upon the record card or strip, means are provided on the respective pins 1, 1' to urge them yieldingly towards the record card or strip. This means could be simple flexible rubber sleeves on the pins or, as shown in Fig. 4, may be a helical spring 11 seated between the rail 3 of the frame 2 and a washer or flange 12 secured to the contact pin. The springs 11 are of larger diameter than the contact pins 1, and the springs on adjacent rows of pins are therefore located between alternate pairs of adjacent rails to obtain a minimum spacing of the pins and therefore a minimum size of record sheet for the recording of a given amount of data.

The original record cards may be prepared by punching in known manner or, in a system of business machines which includes a unit having key-controlled switches for selectively closing circuits to a bank of coding contact pins, the record card may be prepared in that unit by closing the circuits of the pins located at the code spots which are to be vaporized. The remaining and conductive spots of each unit group of six coding spots represent the data recorded by that unit group according to the system here illustrated. The reverse system of employing the non-conducting spots could of course be employed but, in general, the electrical networks are simpler when the conductive spots are the effective control spots of the record cards.

For simplicity of illustration and explanation, the invention will be described with reference to the duplication of a coded record card since the apparatus and electrical network for duplicating a record card are somewhat simpler than the key-controlled apparatus and network for preparing the original record card.

Figure 5:
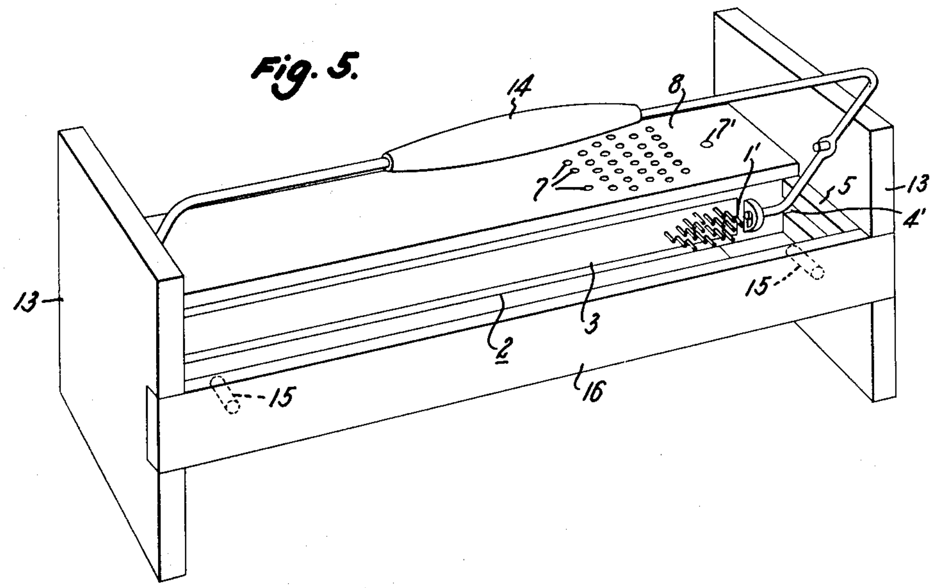
Fig. 5 is a perspective view of a hand-operated unit or frame for sensing a coded record to transfer the recorded data to some auxiliary apparatus of printing and/or computing type by an appropriate electrical network or, alternatively, to condition an electrical network to produce a duplicate of a sensed record card upon inserting a blank card in the apparatus.

As shown in the sensing and coding unit of Fig. 5, the pin-carrying frame 2 is or may be substantially as previously described and it is slidably supported on the grooved rails 5 which are fixed to the side plates 13 of the supporting frame. The terminal plate 8 of the cable system rests upon the rails 5 and is also fixed with respect to the frame plates 13. A handle or bail 14 is pivoted on the frame plates 13 for manual rocking movement to slide the pin frame 2 forwardly to bring the pin contacts 1, 1' into contact with the surface of a record card or record strip 9 suspended by its perforations 10 upon pins 15 mounted upon a cross-bar 16 which extends between the frame plates 13.

If different items are code-recorded on the opposite faces of the record card 9, the intermediate portion of the cross-bar 16 could be replaced by a second pin frame, and the items recorded on both sides of the record card could then be simultaneously sensed and/or duplicated on other record cards.

Figure 7:
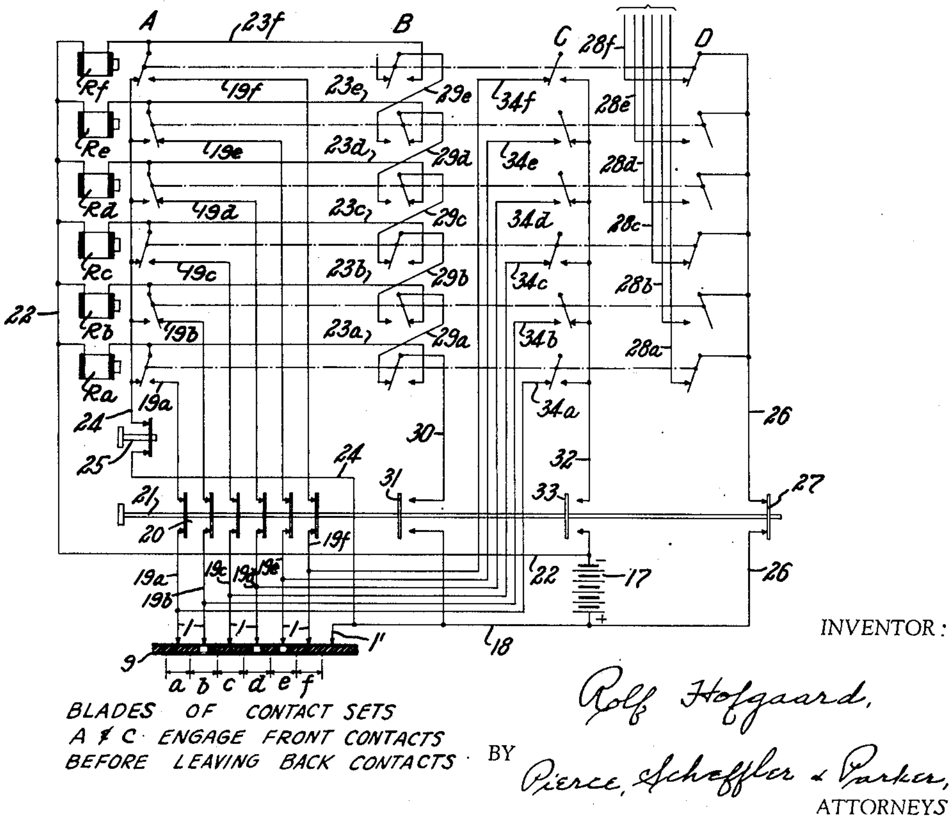
Fig. 7 is a fragmentary circuit diagram of an electrical network for use with the Fig. 5 apparatus; the diagram illustrating the relays associated with only one code recording.

The electrical network associated with only one unit recording of six associated code spots is illustrated in Fig. 7 and it is to be understood that similar networks are provided for each unit recording. The code positions of the unit recording on record card 9 of Fig. 7 are identified by the letters *a–f* respectively, and these letters are added to the several reference numerals identifying electrical conductors to distinguish between the several conductors of each cable group. For clarity and simplicity of illustration, the flexible wires 6 and cable connectors between the contact pins 1 and the electrical network are not indicated in Fig. 7. For explanation of the invention with respect to a specific case, it is assumed that unit code recording on the card 9 of Fig. 7 is constituted by conductive code spots *a*, *c* and *f*.

The contact pin 1' is connected to the positive terminal of a current source, such as a battery 17 by a lead 18, and the six contact pins 1 of the coding unit are individually connected to relays R*a* to R*f* through lines 19*a*–19*f* which include the respective blades of a multiblade switch 20 having a manually operable switch rod 21. The second terminals of the relay windings are returned to the negative terminal of the battery 17 by a common lead 22. The movable elements of the network are illustrated in the positions which they occupy on energization of the code-selected relays in a card sensing operation.

The several relays are of identical construction and each has four sets of switch contacts which each include a single movable blade, the banks of similar sets as they appear in Fig. 7 being identified generally by characters A–D respectively. The contact sets A, B and C are each of double throw type, i. e. the movable blades operate between front and back contacts, and the contact sets D are of single throw type and normally open. The contact sets A constitute holding circuits for the respective relays, the movable blades of each set being connected to a terminal of the associated relay by a jumper 23*a*–23*f* respectively which also extends to the back contact of the associated contact set B. The leads 19*a*–19*f* from the contact pins 1 are connected to the back contacts of the respective contact sets A, and the front contacts of these sets are connected to the positive terminal of the battery 17 by a common lead 24 in which there is a normally closed switch 25. As shown schematically, the front and back contacts of the sets A are resilient blades of known type which are so biased that each moves to the mid-position of the movable blade when not engaged by the latter, whereby the holding circuit of an energized relay is connected across the original energizing circuit through the contact pins before the latter is opened. The current pulses through the foil surface of the card 9 are thus of short duration, and the relays Ra–Rf are of such resistance with respect to the voltage of source 17 that the sensing current pulses are below the value which would affect the foil surface.

Only the contact sets A and D are required for the sensing of a record card to introduce the recorded data into a printing or computing unit, not shown, of the complete business machine. The movable blades of the contact sets D of all relays are connected to a common lead 26 which extends through a switch 27 on switch rod 21 to the positive terminal of the current source, the switch 27 being so positioned on the rod 21 that it is closed when the switch 20 to the relays is closed. Leads 28a–28f extend from the front contacts of the contact sets D to the unit into which the recorded data is to be introduced. The reading-out operation is completed by removing the coded card 9 and manually operating the switch 25 to open the relay holding circuits.

When the record card is to be duplicated, however, the switch 25 is not opened on removal of the card 9 but the switch rod 21 is actuated to open the switches 20 and 27 and to close energizing circuits to the contacts sets B and C after a new, uncoded card 9 is positioned in engagement with the electrical contact points 1 and 1'.

The front contact of set B of relay Ra is connected by a jumper 29a to the movable blade of the contact set B of relay Rb, and the contacts of the sets B of each adjacent pair of relays in the series are cascaded in similar manner by jumpers 29b–29e. The movable blade of contact set B of relay Ra is connected by lead 30 and a switch blade 31 on switch rod 21 to the positive terminal of the current source 17, the blade 31 being so positioned that it completes the circuit of lead 30 only after the opening of switches 20 and 27. The back contacts of sets C of all relays are connected by a common lead 32 and a switch blade 33 on switch rod 21 to the negative terminal of the current source 17, the switch blade 33 being so positioned on the switch rod 21 that it closes the lead 32 circuit simultaneously with the closing of the lead 30 circuit to the contact sets B. The front and back contacts of the switch sets C are resilient blades biased towards the mid-position of the movable blade in such manner that the movable blade is momentarily in contact with both the back contact and the front contact as it is shifted from one end position to the other. No connections are made to the movable blades of the contact sets C, and the front contacts of the several sets are connected by leads 34a–34f to the electrical contact pins 1 at code spots a to f respectively.

The network operates in the following manner to duplicate a coded record card 9 which in the assumed and illustrated case had conductive code spots a, c and f. The coded card is removed after it is sensed to energize the relays Ra, Rc and Rf, as shown in Fig. 7. A new card is positioned for engagement by the contact pins 1 and 1', and the switch rod 21 is moved to the right to open the switches 20 and 27, and to close switches 31 and 33, thus imposing the full voltage of the current source 17 upon the leads 30 and 32 to the contact sets B and C of the relays. The source voltage cannot be applied to the code spots a, c and f through the lead 32, contact sets C and lines 34a, 34c and 34f, since the prior energization of relays Ra, Rc and Rf had shifted the movable blades from the back contacts to the front contacts. The relays which were not previously energized are now energized in sequence by the contact sets B and the jumper connections 29a–29e. Since relay Ra was previously energized, current flows through lead 30, the blade and front contact of set B of relay Ra, jumper 29a, the blade and back contact of set B of relay Rb, and lead 23b to the relay Rb, thereby energizing the same. As the relay Rb pulls in, the blade of its contact set C is momentarily in engagement with both its front and back contacts, thereby transmitting a momentary current pulse to code spot b of the new card over the lead 34b. In like manner, current through the lead 30 and the cascaded sets of contacts B of the relays Ra to Rd energizes the relay Rd as soon as the moving blades of relay Rb engage their respective front contacts, and the relay Re then pulls in on the closure of the moving blades of relay Rd on their front contacts. Momentary current pulses are thus delivered in sequence to the code spots b, d and e. These current pulses are not limited in magnitude by the resistances of the relay windings, as were the sensing current pulses, but are of such value as to melt or evaporate limited area of the metal film to duplicate the code marking of the card previously employed to energize the relays Ra, Rc and Rf.

All relays are energized at the close of the card duplicating operation, and all are reset by momentarily depressing the switch 25 to open the holding circuits of the relays.

It will be apparent that the electrical network of a key-controlled unit for the initial preparation of record cards may differ from the illustrated network only in that the ganged blades of switch 20 are replaced by individually actuated and key-controlled switch blades for selectively connecting the relay input leads 19a–19f to the positive terminal of the current source. Other and simpler networks are possible when the key-controlled unit is employed only to prepare the coded record card and not to enter the item or value in another unit of the complete business machine. In that case, the contact sets B and D will be omitted and the key-controlled circuits will energize the relays corresponding to the code spots which are to be vaporized.

It is to be noted that the Fig. 7 network may be employed to prepare metal surfaced code cards from punched code cards having the same pattern of code spots but with openings at the selected spots which are to be conductive on the metal surfaced card. A punched card is placed over a new metal surface card and this assembly is positioned in the duplicating unit for engagement by the contact pins. On closing the switch 20, the relays Ra to Rf will be selectively energized according to the openings in the punched card. On removing the punched card and shifting the switch rod 21 to close switches 31 and 33, the metal film will be vaporized from the code spots corresponding to the areas not punched from the first card.

This application is a continuation-in-part of and substitute for my copending application Ser.

No. 714,066, filed December 4, 1946, now abandoned.

It is therefore to be understood that, so far as concerns the process of recording data on metal surfaced code cards, the invention is not limited to the particular recording network herein illustrated and described.

I claim:

1. In apparatus for recording data or for sensing data recorded on a record card having a metal film surface, the combination of a plurality of electrical contact pins arranged according to a preselected pattern of code recording spots, a source of current, means for supporting a record card in engagement with said plurality of contact pins, and a circuit network for connecting said current source and said contact pins in series with a record card positioned on said supporting means; said network including alternative sets of recording and sensing current paths for each of said contact pins, switch means for opening one or alternatively the other of said sets of current paths, and means including a relay in the sensing circuit of each contact pin limiting the sensing current therethrough to an order below that value which would vaporize the metal film surface in contact therewith; the resistance of a closed recording current path through each contacting pin being such that current therethrough is of an order sufficient to vaporize the metal film surface in contact with the contact pin.

2. In apparatus as recited in claim 1, the invention wherein the resistance of the relay in the sensing circuit of each contact pin constitutes said means for limiting the sensing current therethrough.

3. In apparatus as recited in claim 1, the invention wherein the relay in the sensing circuit of each contact pin has contacts in the recording circuit of the same contact pin, the construction and arrangement of said contacts being such that energization of a relay on completion of its sensing circuit by a record card on said supporting means opens the recording circuit path of that contact pin.

4. In apparatus as recited in claim 3 and adapted to duplicate a sensed record card, the invention wherein said relays each have a further set of contacts connected in cascade, in combination with means operative on adjustment of said switch means to open said sensing current paths to energize those relays not previously energized on the sensing of a coded record card, thereby to complete recording current paths to contact pins positioned at the code spots at which the sensed record card was conductive.

References Cited in the file of this patent

UNITED STATES PATENTS

| Number | Name | Date |
|---|---|---|
| 1,825,551 | Serrell | Sept. 29, 1931 |
| 2,055,016 | Paris | Sept. 22, 1936 |